United States Patent
Jordan et al.

(10) Patent No.: US 10,252,571 B2
(45) Date of Patent: Apr. 9, 2019

(54) WORK VEHICLE

(71) Applicant: KUBOTA CORPORATION, Osaka (JP)

(72) Inventors: Barry Jordan, Flower Branch, GA (US); Robert Walden, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/295,126

(22) Filed: Oct. 17, 2016

(65) Prior Publication Data

US 2018/0104987 A1    Apr. 19, 2018

(51) Int. Cl.
*B60B 33/02*    (2006.01)
*B60B 33/00*    (2006.01)
*A01D 34/82*    (2006.01)
*A01D 34/64*    (2006.01)

(52) U.S. Cl.
CPC ............ *B60B 33/023* (2013.01); *A01D 34/82* (2013.01); *B60B 33/0005* (2013.01); *B60B 33/0039* (2013.01); *B60B 33/0068* (2013.01); *A01D 34/64* (2013.01); *B60B 2900/131* (2013.01); *B60Y 2200/223* (2013.01)

(58) Field of Classification Search
CPC ..... B60B 33/021; B60B 33/02; B60B 33/023; B60B 33/0005; B60B 33/039; B60B 33/068

See application file for complete search history.

(56) References Cited

U.S. PATENT DOCUMENTS

| 1,968,046 | A | * | 7/1934 | Linn | ................... | B62D 63/067 |
| | | | | | | 122/31.1 |
| 5,014,391 | A | * | 5/1991 | Schulte | ............... | B60B 33/0042 |
| | | | | | | 16/35 R |
| 8,020,648 | B2 | * | 9/2011 | Otto | ...................... | B60B 33/045 |
| | | | | | | 180/6.48 |
| 8,646,952 | B2 | | 2/2014 | Walden et al. | | |
| 9,433,152 | B2 | * | 9/2016 | Bucharzewski | .... | B60B 33/0015 |
| 2006/0010644 | A1 | * | 1/2006 | Foster | ................. | B60B 33/0039 |
| | | | | | | 16/20 |
| 2009/0119878 | A1 | * | 5/2009 | Chou | .................. | B60B 33/0002 |
| | | | | | | 16/35 R |

(Continued)

FOREIGN PATENT DOCUMENTS

| DE | 3410324 | A1 | * | 10/1985 | ......... | B60B 33/0078 |
| EP | 2060409 | A1 | * | 5/2009 | ......... | B60B 33/0007 |

(Continued)

*Primary Examiner* — Nicole T Verley
(74) *Attorney, Agent, or Firm* — Greenblum & Bernstein, P.L.C.

(57) ABSTRACT

A work vehicle includes a vehicle frame, a rotating connection unit provided in the vehicle frame, and a caster assembly connected to the rotating connection unit. The rotating connection unit includes a housing sleeve, a swivel post, a first bearing and a second bearing supporting the swivel post to be rotatable within the housing sleeve, and a rotation stopper disposed between the swivel post and the housing sleeve to stop rotation of the swivel post. The caster assembly includes a caster wheel, and a caster bracket connected to the swivel post to rotatably support the caster wheel.

6 Claims, 3 Drawing Sheets

(56) References Cited

U.S. PATENT DOCUMENTS

| | | | | |
|---|---|---|---|---|
| 2013/0125521 A1* | 5/2013 | Patterson | ............... | A01D 43/04 |
| | | | | 56/14.5 |
| 2014/0101891 A1* | 4/2014 | Hofrichter | .......... | B60B 33/0042 |
| | | | | 16/35 R |
| 2014/0238784 A1* | 8/2014 | Yeo | ....................... | B60B 33/025 |
| | | | | 188/1.12 |
| 2014/0284895 A1* | 9/2014 | Zeng | ..................... | B60B 33/023 |
| | | | | 280/86 |
| 2015/0096846 A1* | 4/2015 | Lin | .................... | B60B 33/0042 |
| | | | | 188/1.12 |
| 2015/0298504 A1* | 10/2015 | Dull | ........................ | B60B 33/02 |
| | | | | 280/86 |
| 2015/0319924 A1* | 11/2015 | Strobbe | ................ | A01D 43/006 |
| | | | | 56/14.7 |
| 2015/0375565 A1* | 12/2015 | Beatty | ................... | B60B 33/021 |
| | | | | 16/35 R |

FOREIGN PATENT DOCUMENTS

| | | | | |
|---|---|---|---|---|
| JP | 58061001 A | * | 4/1983 | |
| WO | WO-03103365 A1 | * | 12/2003 | ......... B60B 33/0005 |

* cited by examiner

WORK VEHICLE

TECHNICAL FIELD OF INVENTION

The present invention relates to work vehicles with caster wheels.

RELATED ART OF INVENTION

U.S. Pat. No. 8,646,952 discloses a zero-turn radius mower including caster wheels acting as front wheels, and a pair of right and left rear wheels receiving drive power independently of each other to turn the mower. The zero-turn radius mower includes caster mounts at lateral opposite ends of a front part of a frame unit forming a vehicle body. Each caster mount includes a U-shaped caster bracket having two arms extending downward, and a caster wheel supported to be rotatable about a horizontal axis between the two arms of the caster bracket. A housing sleeve is attached to the cater mount to receive a rotatable swivel post provided upright on the caster bracket.

To smoothly rotate the swivel post relative to the housing sleeve to turn the vehicle smoothly, a bearing is typically provided between the housing sleeve and the swivel post. The bearing may be a plain bearing or typically a ball bearing or roller bearing, and in particular, a sealed ball bearing or tapered bearing. Using a ball bearing or roller bearing reduces rotation resistance produced between the housing sleeve and the swivel post to easily rotate the swivel post to easily turn the caster wheel. On the other hand, an excessively reduced rotation resistance (in particular, a seal ball bearing reduces the rotation resistance more than a tapered bearing) causes the swivel post to rotate with slight torque to induce a "shimmy" phenomenon in which the caster wheel swings sideways with the vehicle running at high speed (e.g., 5 to 6 mph).

SUMMARY OF INVENTION

The subject matter of the present invention is to provide a work vehicle with caster wheels achieving good turning performance and reducing the chance of causing the "shimmy" phenomenon.

The work vehicle according to one embodiment includes a vehicle frame, a front support device provided forward of the vehicle frame and including a first end and a second end, rotating connection units, and a caster assembly connected to each of the rotating connection units. One of the rotating connection units is provided at the first end of the front support device, and the other of the rotating connection units is provided at the second end of the front support device. Each rotating connection unit includes a housing sleeve, a swivel post, a first bearing and a second bearing supporting the swivel post to be rotatable within the housing sleeve, and a rotation stopper disposed between the swivel post and the housing sleeve to stop rotation of the swivel post. The caster assembly includes a caster wheel, and a caster bracket connected to the swivel post to rotatably support the caster wheel.

With such an arrangement, the rotation stopper produces proper rotation resistance against rotation between the housing sleeve and the swivel post to achieve the good performance to turn the vehicle and reduce the chance of causing the "shimmy" phenomenon.

In one embodiment, the rotation stopper is a bushing element having an inner circumferential surface contacting an outer circumferential surface of the swivel post, and an outer circumferential surface contacting an inner circumferential surface of the housing sleeve. Such a simple bushing structure reduces the manufacturing and assembly costs. The rotation stopper may be made of rubber, in particular, ethylene propylene diene rubber (EPDM) to provide high rotation resistance and high tolerance in dimension.

DETAILED DESCRIPTION OF INVENTION

Embodiments of a work vehicle will be described in detail in reference to the accompanying drawings.

Figure 1:
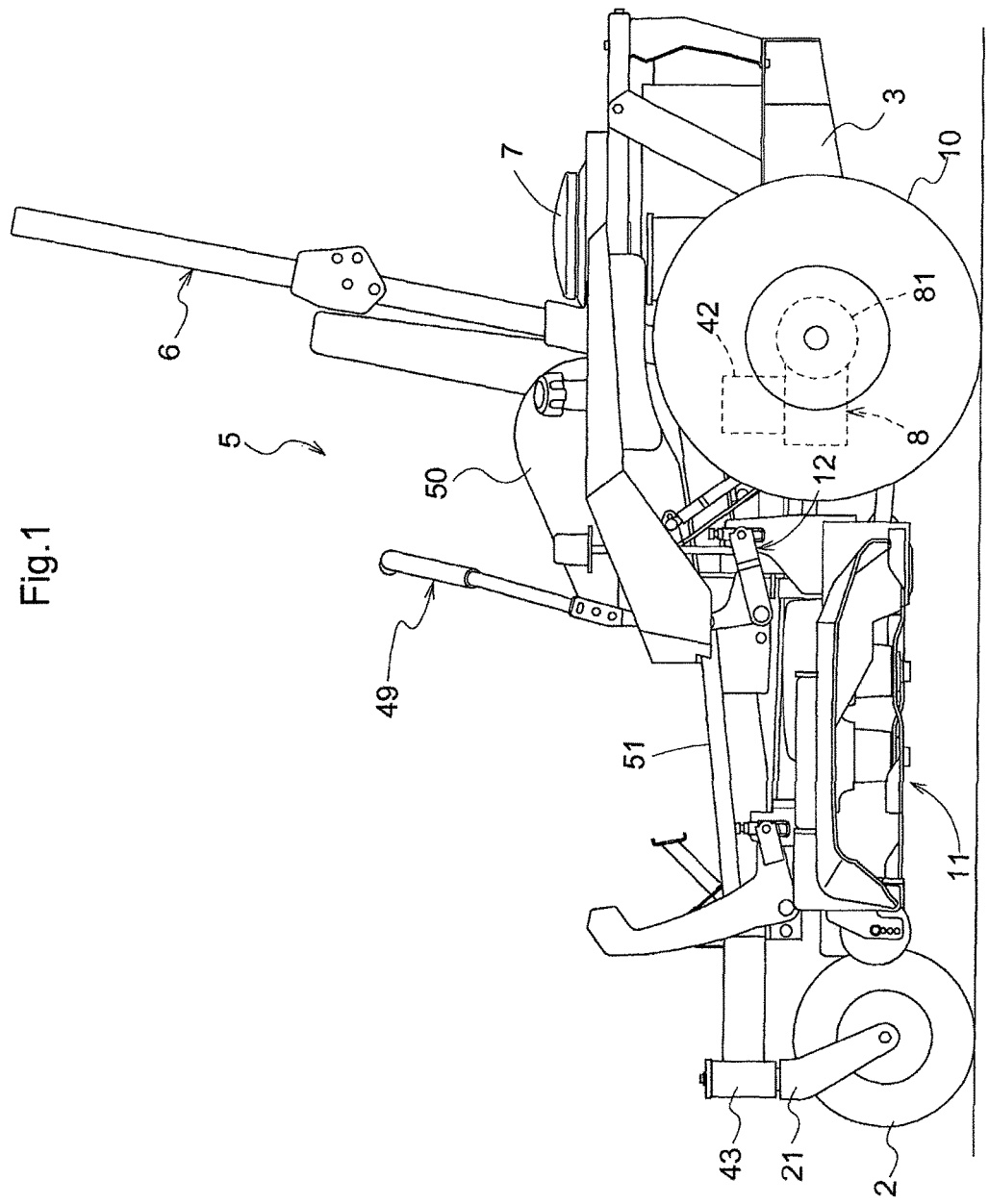
FIG. 1 is a side view of a zero-turn radius mower which is an example of a lawn mower.
Figure 2:
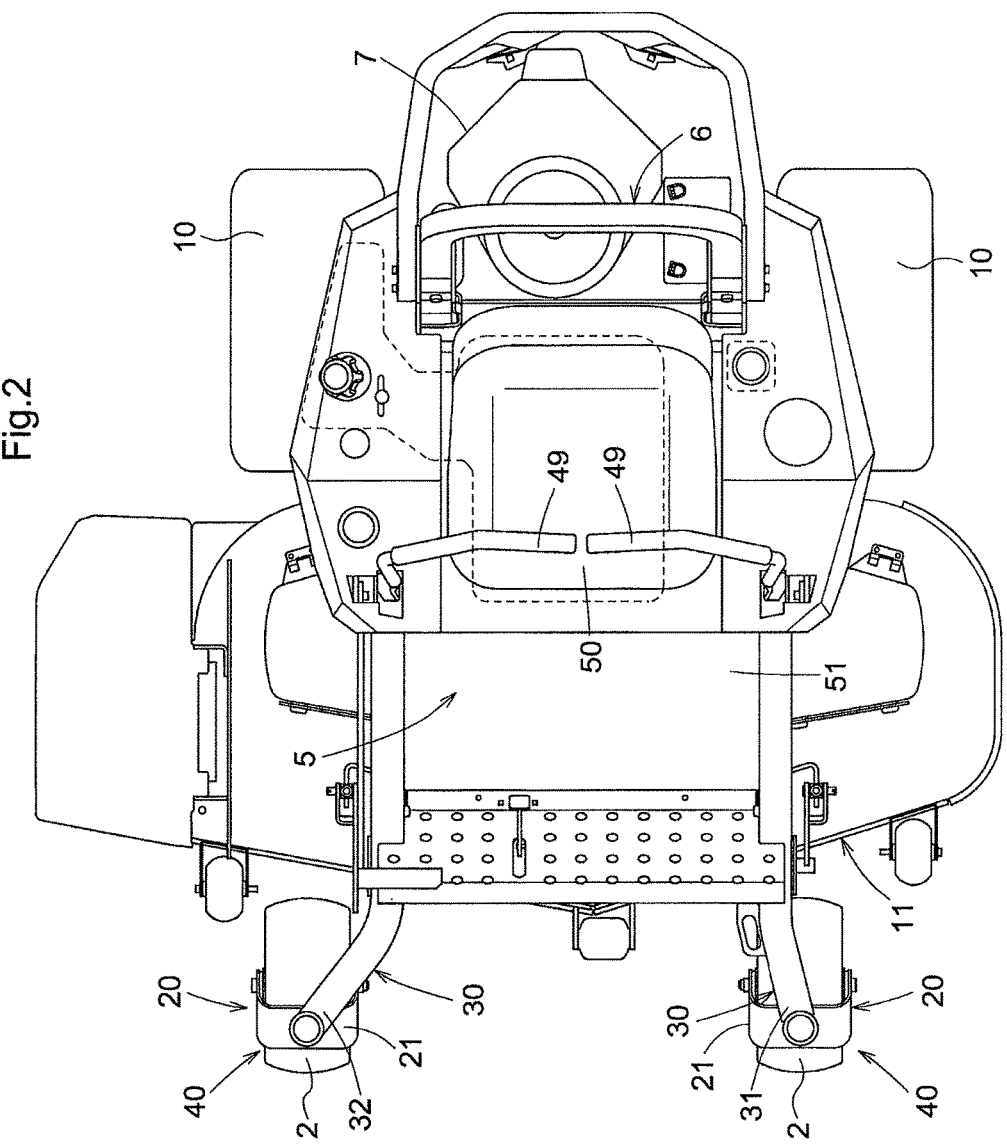
FIG. 2 is a top plan view of the zero-turn radius mower.

The work vehicle is a lawn mower known as a zero-turn radius mower. As understood from FIGS. 1 and 2, the zero-turn mower includes a pair of right and left caster wheels 2 acting as front wheels, and a pair of right and left rear wheels 10 driven and rotated independently of each other. A vehicle frame 3 is supported to the ground by the caster wheels 2 and the rear wheels 10. A mower unit 11 is suspended from the vehicle frame 3 via a link mechanism 12 between the caster wheels 2 and the rear wheels 10. A driver's section 5 is mounted in a central region defined in a front-rear direction of the vehicle frame 3. The driver's section 5 includes a driver's seat 50, a platform 51 disposed forward of the driver's seat 50, and a roll-over protection structure (ROPS) mounted rearward of the driver's section 5. A diesel or gasoline engine 7 is mounted in a rear end region of the vehicle frame 3.

A transmission 8 is mounted forward of the engine 7. The transmission 8 includes a pair of rear-axle transmission devices 81 receiving drive power from the engine 7 through belt transmission mechanisms, for example. The rear-axle transmission devices 81 include hydrostatic transmissions ("HSTs" hereinafter) 42 that are operable independently of each other. Each HST 42 is configured to change the engine power steplessly between low speed and high speed in a forward drive state or a reverse drive state to transmit the power to the right and left rear wheels 10. This allows both the right and left rear wheels 10 to be driven forward at the same or substantially the same speed to produce straight forward drive and to be driven reversely at the same or substantially the same speed to produce straight reverse drive. Further, the right and left rear wheels 10 may be driven at different speeds from each other to turn the vehicle frame 3 to a desired direction. For example, one of the right and left rear wheels 10 is driven at low speed close to zero, and the other of the right and left rear wheels 10 is driven forward or reversely at high speed to make a small-radius turn. Also, the right and left rear wheels 10 may be driven opposite from each other to allow the vehicle frame 3 to make a spin turn centering about a substantial middle part between the right and left rear wheels 10.

Change-speed operations for the right and left HSTs 42 are performed with a pair of right and left shift levers 49 provided in lateral opposite sides of the driver's seat 50. The shift lever 49 is held at a longitudinal neutral position to allow the HST 42 to be neutral, operated forward from the neutral position to produce a forward drive, and operated rearward to produce a reverse drive.

Each of the pair of right and left caster wheels 2 may turn about a vertical axis to freely change its direction, and thus correct the direction in response to a running direction of the vehicle driven by the right and left rear wheels 10. The vehicle frame 3 includes a pair of right and left front-wheel support arms 30 provided at a front end thereof. A left rotating connection unit 40 is provided at a first end 31 acting as one of the front-wheel support arms 30, and a right rotating connection unit 40 is provided at a second end 32 acting as the other of the front-wheel support arms 30. The left rotating connection unit 40 is rotatably connected to a left caster assembly 20 including the left caster wheel 2. The right rotating connecting unit 40 is rotatably connected to a right caster assembly 20 including the right caster wheel 2.

Figure 3:
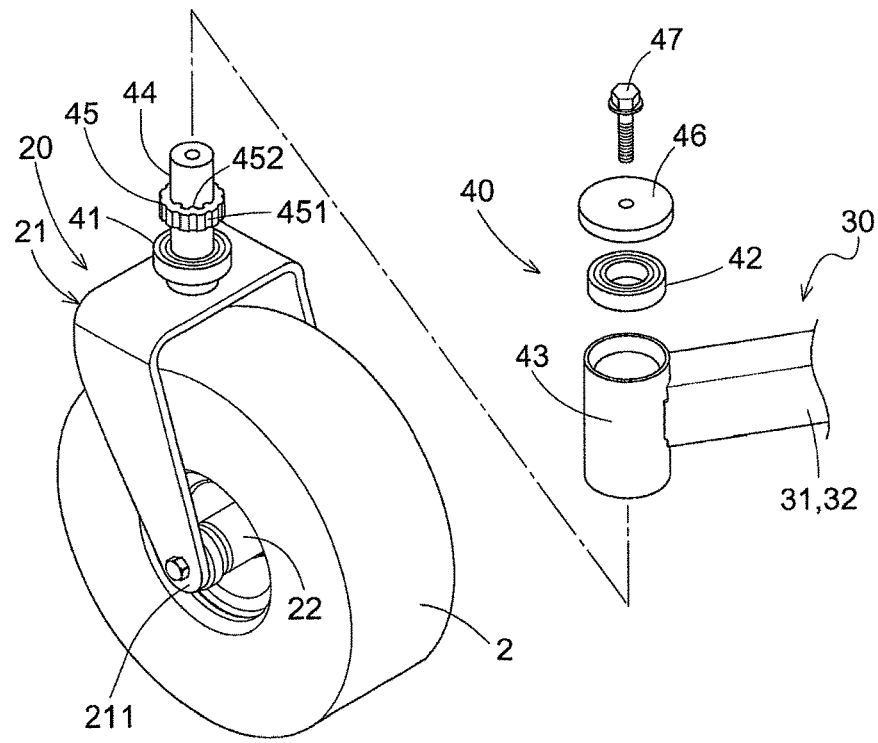
FIG. 3 is an exploded perspective view of a caster-wheel assembly and a rotating connection unit.

As understood from FIG. 3, each caster assembly 20 includes a U-shaped caster bracket 21 and a caster shaft 22 in addition to the caster wheel 2. The caster shaft 22 has opposite ends fixedly bolted to leg ends 211 of the caster bracket 21 to support the caster wheel 2 to be rotatable in a central part of the caster shaft 22.

Figure 4:
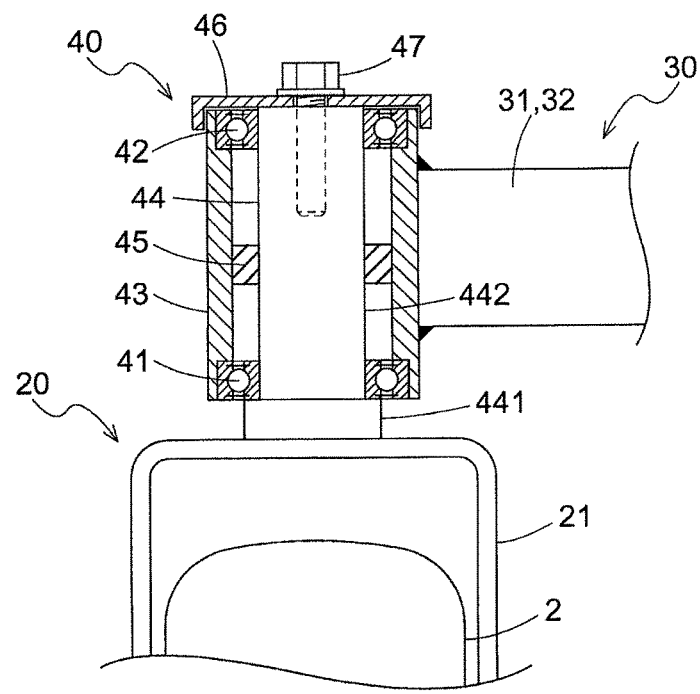
FIG. 4 is a partially sectional side view of the caster-wheel assembly and the rotating connection unit.

As shown in FIG. 4, each rotating connection unit 40 includes a housing sleeve 43, a swivel post 44, a first bearing 41, a second bearing 42, and a rotation stopper 45. The housing sleeve 43 is cylindrical and connected on its outer circumferential surface by welding, for example, to the first end 31 defining the left front-wheel support arm 30 or the second end 32 defining the right front-wheel support arm 30. The swivel post 44 is provided upright on a top surface of the caster bracket 21, having a proximal end portion 441 and a shaft portion 442 extending from the proximal end portion 441. The proximal end portion 441 has a larger diameter than the shaft portion 442.

The swivel post 44 is inserted into the housing sleeve 43. The first bearing 41 is attached to a lower end of the shaft portion 442 of the swivel post 44 and the second bearing 42 is attached to an upper end of the shaft portion 442 of the swivel post 44 to allow the swivel post 44 to be rotatably supported to the housing sleeve 43. The proximal end portion 441 of the swivel post 44 acts as a seat for the first bearing 41. A pressing washer 46 is fastened to the swivel post 44 through a bolt 47 to hold the second bearing 42 in place. In one or more embodiments, the first bearing 41 and the second bearing 42 are sealed ball bearings with no grease.

The rotation stopper 45 is a bushing element having an inner circumferential surface contacting an outer circumferential surface of the shaft portion 442 of the swivel post 44, and an outer circumferential surface contacting an inner circumferential surface of the housing sleeve 43. The rotation stopper 45 is unrotatably fixed to the housing sleeve 43 and is not fixed to the swivel post 44 to cause friction between the outer circumferential surface of the swivel post 44 and the inner circumferential surface of the rotation stopper 45 thereby to stop rotation of the swivel post 44. To control the rotation location of the swivel post 44, the rotation stopper 45 has an outer surface 451 and an inner surface 452 formed by projections and recesses arranged in series to form a bumpy surface. The outer surface 451 differs from the inner surface 452 in unevenness. More particularly, the outer surface 451 has unevenness that is suitable for positioning the rotation stopper 45 unrotatably fixed to the housing sleeve 43, and the inner surface 452 has unevenness that is suitable for applying friction forces between the swivel post 44 and the rotation stopper 45.

In one or more embodiments, the rotation stopper 45 is unrotatably fixed to the swivel post 44, not to the housing sleeve 43, to cause sliding friction between the rotation stopper 45 and the housing sleeve 43. The sliding friction may be applied both between the rotation stopper 45 and the swivel post 44 and between the rotation stopper 45 and the housing sleeve 43. In any case, the rotation stopper 45 receives a strong sliding frictional force, and may be made of high-friction material, preferably rubber, and more preferably ethylene propylene diene rubber (EPDM).

In one or more embodiments, the rotation stopper 45 has any other shape than the bushing shape that applies a rotation load between the housing sleeve 43 and the swivel post 44.

The work vehicle may be any other lawn mowers than the zero-turn radius mowers and any other work vehicles such as tractors or trucks.

What is claimed is:

1. A work vehicle comprising:
   a vehicle frame;
   a front support device provided forward of the vehicle frame and including a first end and a second end;
   rotating connection units, one of the units being provided at the first end of the front support device, the other of the units being provided at the second end of the front support device, each rotating connection unit including
      a housing sleeve,
      a swivel post,
      a first bearing and a second bearing supporting the swivel post to be rotatable within the housing sleeve, and
      a rotation stopper disposed between the swivel post and the housing sleeve to stop rotation of the swivel post, wherein the rotation stopper is a single piece and is one of:
      unrotatably fixed to the housing sleeve and not fixed to the swivel post, or;
      unrotatably fixed to the swivel post and not fixed to the housing sleeve;
      to allow for sliding friction between the rotation stopper and at least one of the swivel post or the housing sleeve; and
   a caster assembly connected to each of the rotating connection units, the caster assembly including
      a caster wheel, and
      a caster bracket connected to the swivel post to rotatably support the caster wheel.

2. The work vehicle according to claim 1, wherein the rotation stopper comprises a bushing element having an inner circumferential surface contacting an outer circumferential surface of the swivel post, and an outer circumferential surface contacting an inner circumferential surface of the housing sleeve.

3. The work vehicle according to claim 2, wherein the rotation stopper is made of rubber.

4. The work vehicle according to claim 2, wherein the outer circumferential surface and the inner circumferential surface of the rotation stopper have projections and recesses arranged in series.

5. The work vehicle according to claim 2, wherein the outer circumferential surface differs from the inner circumferential surface in unevenness.

6. The work vehicle according to claim 1, wherein
   the first bearing and the second bearing comprise two sealed ball bearings vertically spaced apart from each other, and the rotation stopper is disposed between the two sealed ball bearings.

\* \* \* \* \*